US008106900B2

(12) United States Patent
Koyama

(10) Patent No.: US 8,106,900 B2
(45) Date of Patent: Jan. 31, 2012

(54) CONTROL METHOD FOR INFORMATION DISPLAY DEVICE AND AN INFORMATION DISPLAY DEVICE

(75) Inventor: Fumio Koyama, Hara-mura (JP)

(73) Assignee: Seiko Epson Corporation (JP)

( * ) Notice: Subject to any disclaimer, the term of this patent is extended or adjusted under 35 U.S.C. 154(b) by 692 days.

(21) Appl. No.: 12/241,172

(22) Filed: Sep. 30, 2008

(65) Prior Publication Data

US 2009/0091561 A1 Apr. 9, 2009

(30) Foreign Application Priority Data

Oct. 3, 2007 (JP) ................................ 2007-259995

(51) Int. Cl.
*G06F 3/038* (2006.01)

(52) U.S. Cl. ......... 345/211; 345/107; 345/100; 359/296

(58) Field of Classification Search .................. 345/100, 345/92–98, 147, 107, 211, 214; 348/674, 348/792; 349/159; 359/296
See application file for complete search history.

(56) References Cited

FOREIGN PATENT DOCUMENTS

| | | |
|---|---|---|
| JP | 58-23091 | 2/1983 |
| JP | 2007-86529 | 4/2007 |

*Primary Examiner* — Lun-Yi Lao
*Assistant Examiner* — Shaheda Abdin
(74) *Attorney, Agent, or Firm* — Harness, Dickey & Pierce, P.L.C.

(57) ABSTRACT

A method of controlling an electro-optical element that includes a memory type electro-optical layer between a pixel electrode and a common electrode is described. The method includes suspending supplying power to a display driving circuit and a latch circuit and subsequently resupplying power to the display driving circuit. The method includes subsequently applying a first voltage to the common electrode using the display driving circuit and subsequently applying a second voltage to the common electrode using the display driving circuit. The second voltage (i) is different from the first voltage and (ii) varies a potential of the pixel electrode according to a charge state of the memory type electro-optical layer. The method includes subsequently applying a third voltage to the common electrode using the display driving circuit, wherein the third voltage is between the first voltage and the second voltage. The method further includes subsequently resupplying power to the latch.

5 Claims, 4 Drawing Sheets

AT THE TIME OF PIXEL WRITING

COMMON ELECTRODE
L → H

AT THE TIME OF PIXEL
REPRODUCTION

COMMON ELECTRODE
L → H

LATCH CIRCUIT
OPERATION
H → Vth

CONTROL METHOD FOR INFORMATION DISPLAY DEVICE AND AN INFORMATION DISPLAY DEVICE

BACKGROUND

1. Technical Field

The present invention relates to a technique for acquiring a display state of a memory type display.

2. Related Art

Information display devices called "electronic papers" or "electronic books" have been developed. Many of the information display devices have a memory type display. The term "memory type" as used herein refers to a characteristic that can maintain a display for a certain time even without power supply. As the memory type display, for example, an electrophoresis display (hereinafter referred to as "EPD") has been known. JP-A-2007-08529 discloses an EPD that has a holding capacitor for holding data of pixels in order to speed up the rewriting of image. In addition, JP-A-58-023091, which relates not to an EPD but to a liquid crystal display, discloses to use a memory cell (latch circuit) instead of a capacitor.

Data once written into pixels are lost even when the display has the holding capacitor as in JP-A-2007-08529. That is, data are stored in the holding capacitor as charges, but the charges are gradually lost because even the holding capacitor cannot hold the charges for a long time. It is also conceivable to use the memory cell as in JP-A-58-023091. However, power is required for the memory cell to maintain data, and data are lost when the power is not supplied. Since an EPD is most advantageous in that it can maintain a display even without power supply, supplying power to the memory cell in order to maintain data is to eliminate the advantage of the EPD.

As described above, while the EPD can maintain a display even without power supply, data to be displayed are lost. This involves the following problem, for example. In the EPD, when power is not supplied for a long time, migrating particles move due to thermal motion or ambient electric field, resulting in a reduction in contrast. In this case, the same data must be prepared again to refresh a display. It is also conceivable to store display data to a non-volatile memory different from a display. However, it is difficult to configure the EPD to include a memory of large capacity corresponding to the number of pixels.

SUMMARY

The invention provides a technique for acquiring a display value held in a pixel without using an additional non-volatile memory.

A control method for an information display device of the invention is a control method for an information display device including: a display having a data line applied with a data voltage, a switching element having a first input terminal connected to the data line and a first output terminal for turning on and off a signal between the first input terminal and the first output terminal, a latch circuit having a second input terminal connected to the switching element and a second output terminal for holding a voltage according to a data voltage input from the switching element via the second input terminal and for outputting the held voltage, a pixel electrode connected to the second output terminal, a common electrode, and a memory type electro-optical layer interposed between the pixel electrode and the common electrode; a display driving circuit for driving the display; and a power control circuit for controlling the supply of power to the latch circuit and the display driving circuit. The control method includes: stopping, by the power control circuit, the supply of power to the display driving circuit; stopping, by the power control circuit, the supply of power to the latch circuit; supplying, by the power control circuit, power to the display driving circuit after the supply of power to the display driving circuit and the latch circuit is stopped; applying, by the display driving circuit, a first voltage to the common electrode after power is supplied to the display driving circuit; applying, by the display driving circuit, a second voltage, which is different from the first voltage and varies a potential of the pixel electrode according to a charge state of the memory type electro-optical layer, to the common electrode after the first voltage is applied; applying, by the display driving circuit, a third voltage, which is a voltage between the first voltage and the second voltage, to the common electrode after the second voltage is applied; and supplying, by the power control circuit, power to the latch circuit after the third voltage is applied.

According to the control method, a display value held in the memory type electro-optical layer is acquired.

A control method for an information display device of the invention may include applying, by the display driving circuit, a fourth voltage, which is a voltage between the first voltage and the second voltage, to the data line as a data voltage after the third voltage is applied and before power is supplied to the latch circuit.

According to the control method, an initial value of the input terminal of the latch circuit can be given more stably.

In a control method for an information display device of the invention, the third voltage may be an intermediate voltage between the first voltage and the second voltage.

According to the control method, since the intermediate voltage between the first voltage and the second voltage is applied, a display value held in the memory type electro-optical layer is acquired.

In a control method for an information display device of the invention, the display may have a plate line and a ferroelectric capacitor connected to the second input terminal at one end and connected to the plate line at the other end, and the plate line may be driven so as to be at the same potential as the common electrode when a display is rewritten in the display.

According to the control method, a potential according to a pixel is given to the input terminal of the latch circuit as an initial value.

An information display device of the invention includes a display having a data line applied with a data voltage, a switching element having a first input terminal connected to the data line and a first output terminal for turning on and off a signal between the first input terminal and the first output terminal, a latch circuit having a second input terminal connected to the switching element and a second output terminal for holding a voltage according to a data voltage input from the switching element via the second input terminal and for outputting the held voltage, a pixel electrode connected to the second output terminal, a common electrode, a plate line, and a ferroelectric capacitor connected to the second input terminal at one end and connected to the plate line at the other end.

According to the information display device, a display value held in the memory type electro-optical layer is acquired.

DESCRIPTION OF EXEMPLARY EMBODIMENTS

1. First Embodiment

1-1. Configuration

Figure 1:
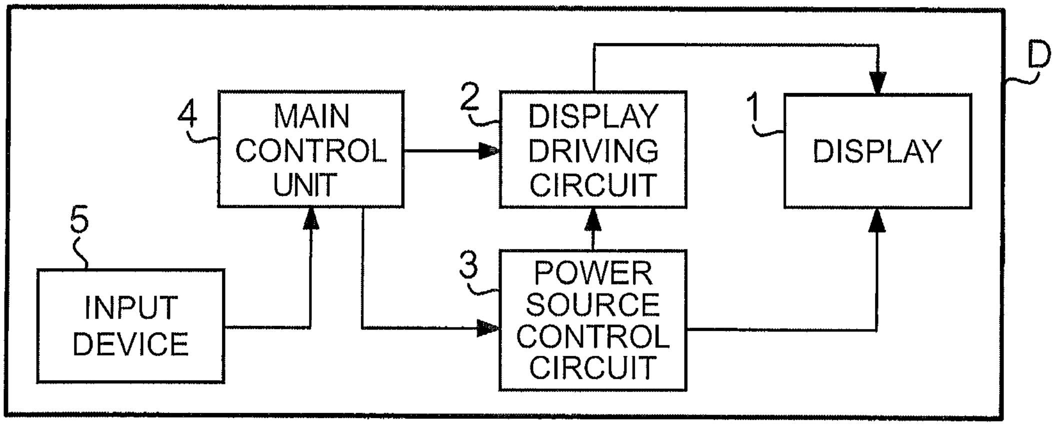
FIG. 1 is a view showing a configuration of an information display device D.

FIG. 1 is a view showing a configuration of an information display device D of the invention. In this example, the information display device D is an electronic paper. A display 1 displays information including a character or an image. A display driving circuit 2 controls the display 1. A power source control circuit 3 controls the supply of power to the display driving circuit 2 and a latch circuit 20 described later. A main control unit 4 includes, for example, a CPU (central processing unit), a RAM (random access memory), and a ROM (read only memory), which control configuration elements of the information display device D. An input device 5 is, for example, a button (refresh button or rewriting button), a keypad, a dial or the like that outputs a signal according to an operation of a user to the main control unit 4.

Figure 2:
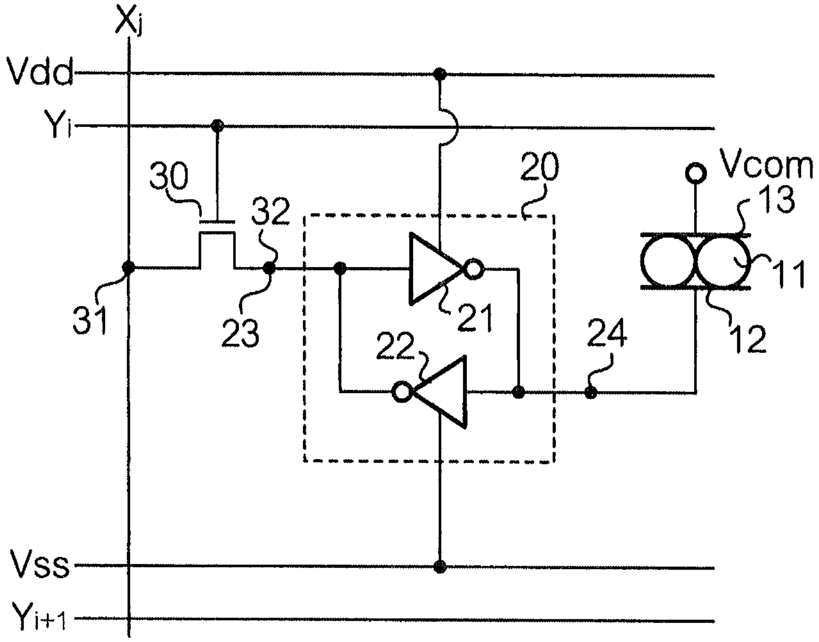
FIG. 2 is a view showing a circuit configuration of a display 1 according to a first embodiment.

FIG. 2 is a view showing a circuit configuration of the display 1 according to a first embodiment. The display 1 has n×m matrix wiring including n rows of scanning lines ($Y_1$, $Y_2$, . . . , $Y_i$, . . . , $Y_n$) and m columns of data lines ($X_1$, $X_2$, . . . , $X_j$, . . . , $X_m$). A pixel is provided corresponding to each crossing of the scanning lines and the data lines. In FIG. 2, only a portion that represents a pixel corresponding to the scanning line $Y_i$ and the data line $X_j$ is extracted and illustrated.

A voltage showing data (display value) (hereinafter referred to as "data voltage") written into the pixel is applied to the data line $X_j$ by the display driving circuit 2.

A switching element 30 is an element that turns on and off a signal input to the latch circuit 20. More specifically, the switching element 30 has an input terminal 31 (first input terminal) and an output terminal 32 (first output terminal) and turns on and off a signal between the input terminal 31 and the output terminal 32. The input terminal 31 is connected to the data line $X_j$. The output terminal 32 is connected to the latch circuit 20. In this example, the switching element 30 is a field effect transistor (hereinafter referred to as "FET"). A gate of the FET is connected to the scanning line $Y_i$, a source thereof is connected to the data line $X_j$, and a drain thereof is connected to the latch circuit 20. In the case of using an n-channel FET, when a high level voltage is applied to the scanning line $Y_i$, the source and drain of the FET are short-circuited, whereby the data voltage is input to the latch circuit 20. Further, when a low level voltage is applied to the scanning line $Y_i$, the source and drain of the FET are opened, whereby the data voltage is not input to the latch circuit 20.

The latch circuit 20 is a device for holding, that is, storing data written into a pixel. The latch circuit 20 has an input terminal 23 (second input terminal) and an output terminal 24 (second output terminal). The input terminal 23 and the output terminal 24 are connected to the switching element 30 and a pixel electrode 12, respectively. In this example, the latch circuit 20 is a so-called dual-inverter type latch circuit that includes two inverters of an inverter 21 and an inverter 22. The input and output of the latch circuit 20 are logically inverted from each other because there are the inverter 21 and the inverter 22 between the input terminal 23 and the output terminal 24. That is, the latch circuit 20 outputs not the input data voltage as it is but a voltage obtained by logically inverting the data voltage. Voltage is applied, that is, power is supplied to the inverter 21 and the inverter 22 by a voltage line $V_{dd}$ and a voltage line $V_{ss}$, respectively. Hereinafter, voltages applied by the voltage line $V_{dd}$ and the voltage line $V_{ss}$ will be described using the same signs as those of the voltage lines like a voltage $V_{dd}$ and a voltage $V_{ss}$, respectively.

The pixel electrode 12 and a common electrode 13 are electrodes used for the application of voltage to an electro-optical layer 11. The electro-optical layer 11 is interposed between the pixel electrode 12 and the common electrode 13. A voltage according to the potential difference between the pixel electrode 12 and the common electrode 13 is applied to the electro-optical layer 11. The pixel electrode 12 is provided for each pixel one by one. One common electrode 13 is provided in common for all pixels.

The electro-optical layer 11 is a layer including a material that changes in optical property when power is given. In this example, the electro-optical layer 11 includes a memory type electro-optical material, for example, an electrophoretic particle. More specifically, the electrophoretic particle includes a negatively charged black particle and a positively charged white particle.

Voltages applied to the common electrode 13, the data line $X_j$, and the scanning line $Y_i$ are controlled by the display driving circuit 2. That is, an output terminal of the display driving circuit 2 is connected to the common electrode 13, the data line $X_j$, and the scanning line $Y_i$. Voltages applied to the voltage line $V_{dd}$ and the voltage line $V_{ss}$ of the latch circuit 20 are controlled by the power source control circuit 3. That is, an output of the power source control circuit 3 is connected to the voltage line $V_{dd}$ and the voltage line $V_{ss}$.

1-2. Operation

Figure 3:
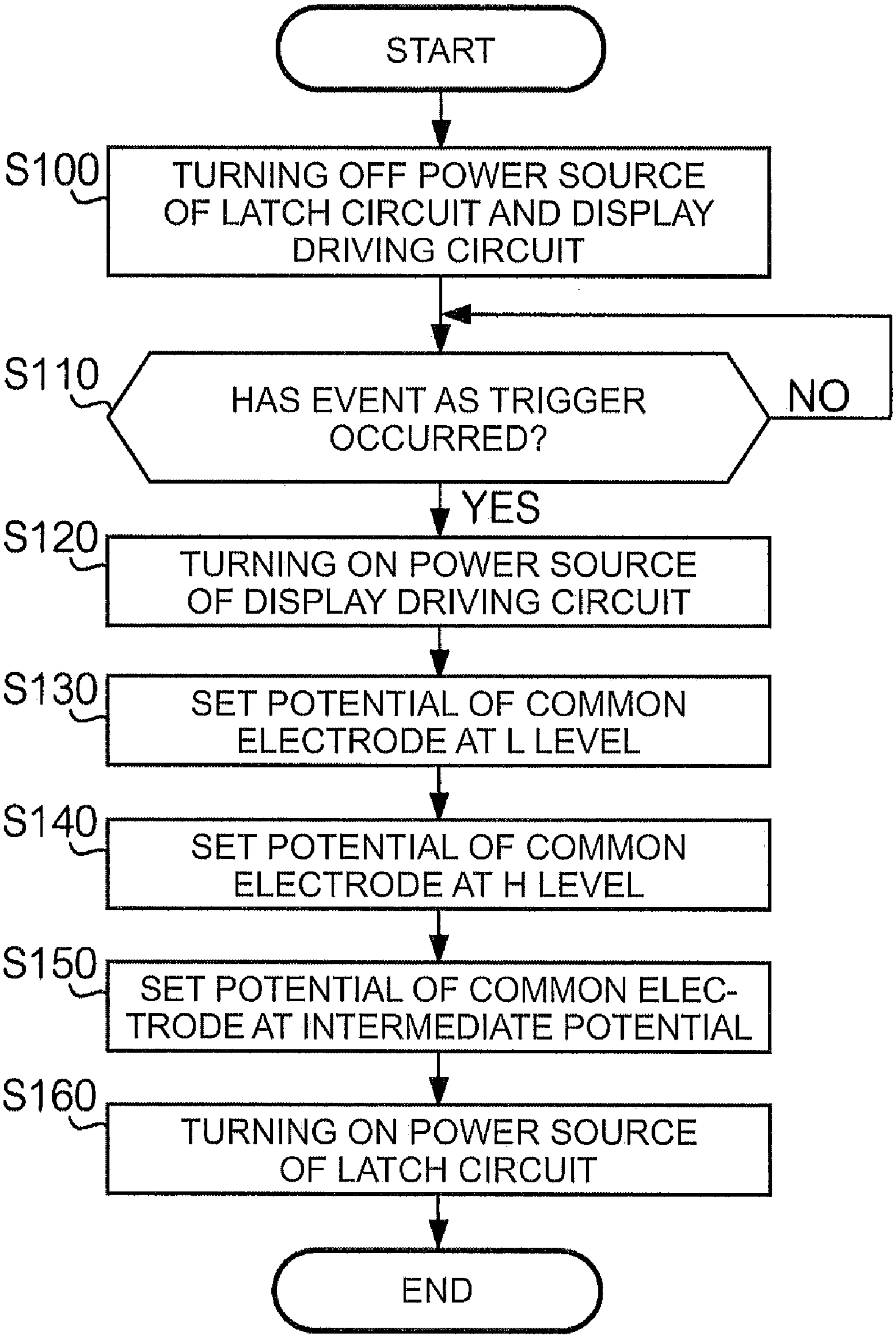
FIG. 3 is a flow chart showing an operation of the information display device D.

FIG. 3 is a flow chart showing an operation of the information display device D. For example, the flow of FIG. 3 starts with the fact that the input device 5 is not operated for a predetermined time, that is, a time period during which a signal showing some input is not output from the input device 5 continues for a predetermined time as a trigger.

Figure 4A:
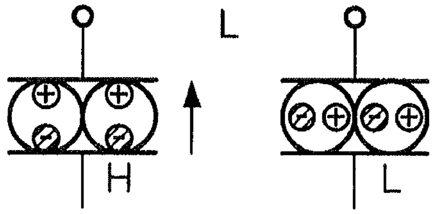
FIG. 4A to FIG. 4E are views illustrating by an example the charge state of an electro-optical layer 11.
Figure 4B:
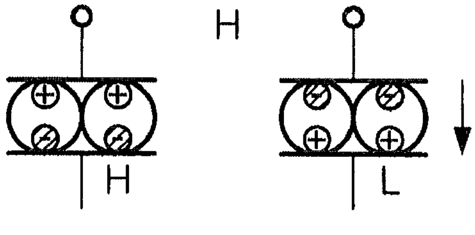

FIG. 4A to FIG. 4E are views illustrating by an example the charge state of the electro-optical layer 11. In this example, the charge states of two pixels of a pixel A and a pixel B are shown. In FIG. 4A to FIG. 4E, those situated on the lower side are the pixel electrodes 12, while those situated on the upper side are the common electrodes 13. Now, it is assumed that white and black are displayed in the pixel A and the pixel B, respectively, on the condition that they are observed from the upper side, that is, the common electrode side. FIG. 4A and FIG. 4B show a procedure of image writing. The data voltage is applied to the pixel electrode 12, that is, a high level (hereinafter referred to as "H level") voltage $V_H$ is applied to the pixel A for displaying white, while a low level (hereinafter referred to as "L level") voltage $V_L$ is applied to the pixel B for displaying black. First, as shown in FIG. 4A, the voltage $V_L$ is applied to the common electrode 13. Since a potential difference is generated between the pixel electrode 12 and the common electrode 13 in the pixel A, the electrophoretic particles move. That is, the negatively charged black particles move to the pixel electrode 12 side, and the positively charged white particles move to the common electrode 13 side in the pixel A, resulting in the display of white. Subsequently, as shown in FIG. 4B, the voltage $V_H$ is applied to the common electrode 13. Since a potential difference is generated between the pixel electrode 12 and the common electrode 13 in the pixel B, the electrophoretic particles move. That is, the positively charged white particles move to the pixel electrode 12 side, and the negatively charged black particles move to the common electrode 13 side in the pixel B, resulting in the display of black. When the rewriting of display is completed, the charge states of the pixel A and the pixel B are as shown in FIG. 4B. Hereinafter, description will be made with reference to FIG. 3 and FIG. 4A to FIG. 4E.

In step S100, the power source control circuit 3 stops the supply of power to the display driving circuit 2 and the latch circuit 20, that is, turns off the power source. Before turning off the power source, the display 1 displays some image. Even without the supply of power, the display 1 maintains the display. When the power source is turned off, the charge states of the pixels are as shown in FIG. 4B. It is not always necessary to simultaneously stop the supply of power to the display driving circuit 2 and the latch circuit 20 in step S100. For example, it is sufficient that the supply of power is stopped in some order such that the power supply to the display driving circuit 2 is first stopped, and then the power supply to the latch circuit 20 is stopped, and that finally the supply of power to the display driving circuit 2 and the latch circuit 20 is stopped.

In step S110, the main control unit 4 determines whether an event as a trigger for starting the reading of a display value has occurred. For example, the event as the trigger is an event that the refresh button is pressed. When determining that the event as the trigger has not occurred (S110: NO), the main control unit 4 stands by until the event occurs. When determining that the event as the trigger has occurred (S110: YES), the main control unit 4 moves processing to step S120.

In step S120, the power source control circuit 3 starts the supply of power to the display driving circuit 2, that is, turns on the power source. At this time, the power source of the latch circuit 20 is not turned on yet.

In step S130, the display driving circuit 2 sets the potential of the common electrode 13 at a predetermined potential, that is, the L level in this case. That is, the display driving circuit 2 applies the voltage $V_L$ (first voltage) to the common electrode 13.

Figure 4C:
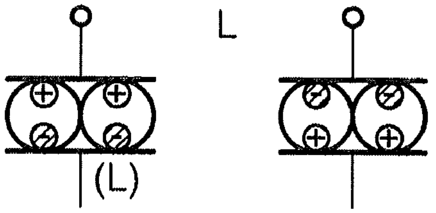

FIG. 4C is a view showing the charge state of the electro-optical layer 11 in step S130. The potential of the common electrode 13 is at the L level. The potential of the pixel electrode 12 is inconstant but substantially at the L level. Therefore, the electrophoretic particles do not move.

In step S140, the display driving circuit 2 sets the potential of the common electrode 13 at a predetermined potential, that is, the H level in this case. That is, the display driving circuit 2 applies the voltage $V_H$ (second voltage) to the common electrode 13. The voltage $V_H$ is a voltage different from the voltage $V_L$.

Figure 4D:
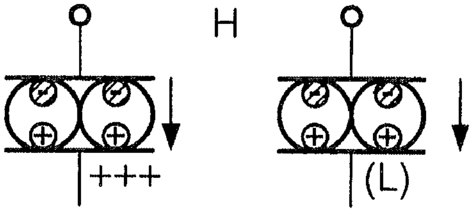

FIG. 4D is a view showing the charge state of the electro-optical layer 11 in step S140. When the potential of the common electrode 13 is at the H level, a potential difference is generated between the common electrode 13 and the pixel electrode 12, whereby the common electrode 13 is higher in potential. Due to the potential difference, the electrophoretic particles move in the pixel A. That is, the display value is inverted in the pixel A to display black. Due to the inversion of the pixel, positive charges are induced on the pixel electrode 12 in the pixel A. In the pixel B where black is originally displayed, since the electrophoretic particles do not move, the positive charges are not induced on the pixel electrode 12. That is, the potential of the pixel electrode 12 is different between the pixel A and the pixel B. Now, $V_A=V_B+\Delta V$, that is, $V_A>V_B$ where the potential of the pixel electrode 12 in the pixel A is $V_A$, the potential of the pixel electrode 12 in the pixel B is $V_B$, and the change in potential due to the positive charges induced on the pixel electrode 12 in the pixel A is $\Delta V$.

In step S150, the display driving circuit 2 sets the potential of the common electrode 13 at a predetermined intermediate level (hereinafter referred to as "M level"). The M level potential is a potential between the H level and the L level. As will be described later, the potential of the common electrode 13 is set at the M level at this time in order that the potential may be slightly (by $\Delta V/2$, for example) lower than $V_{th}$ assuming the potential of the input terminal 23 of the latch circuit 20 as $V_{th}$. The display driving circuit 2 applies an M level voltage (third voltage) $V_M$ to the common electrode 13. Accordingly, the potential of the pixel electrode 12 is lowered by an amount $(V_H-V_M)$. Now, it is assumed that the M level is $V_M=V_{th}-\Delta V/2$, which is intermediate between the H level and the L level. The potential of the pixel electrode 12 in this case is $V_A=V_M+\Delta V=V_{th}+\Delta V/2$ in the pixel A, while $V_B=V_M=V_{th}-\Delta V/2$.

In step S160, the power source control circuit 3 starts the supply of power to the latch circuit 20, that is, turns on the power source. It is known that the initial state of the latch circuit 20 is determined by the slight potential difference between the initial potentials of the input terminal 23 and the output terminal 24. In general, the initial state of the latch circuit 20 is inconstant if both of the input terminal 23 and the output terminal 24 are opened. In this example, however, the potential of the input terminal 23 is at $V_{th}$, whereas the potential of the output terminal 24 connected with the pixel electrode 12 in the pixel A displaying white is at $V_{th}+\Delta V/2$. That is, since the output terminal 24 is higher in potential than the input terminal 23 of the latch circuit 20 in the pixel A, the latch circuit 20 stably starts with the initial value of output being at the H level. That is, the same state as at the time of writing is reproduced.

On the other hand, the potential of the output terminal 24 connected with the pixel electrode 12 in the pixel B displaying black is at $V_{th}-\Delta V/2$. That is, since the output terminal 24 is lower in potential than the input terminal 23 of the latch circuit 20 in the pixel B, the latch circuit 20 stably starts with the initial value of output being at the L level. Also in this case, the same state as at the time of writing is reproduced.

Figure 4E:
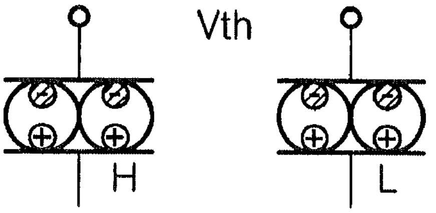

FIG. 4E is a view showing the charge state of the electro-optical layer 11 in step S160. The same voltages (FIG. 4A and FIG. 4B) as at the time of writing data are applied to the pixel electrodes 12 in the pixel A and the pixel B, respectively. That is, the display value (data) displayed on the pixel is reproduced in the latch circuit 20. Thereafter, when the voltage of the common electrode 13 is controlled in the same manner as in FIG. 4A and FIG. 4B, the display of pixel is refreshed, that is, made clear.

Figure 5:
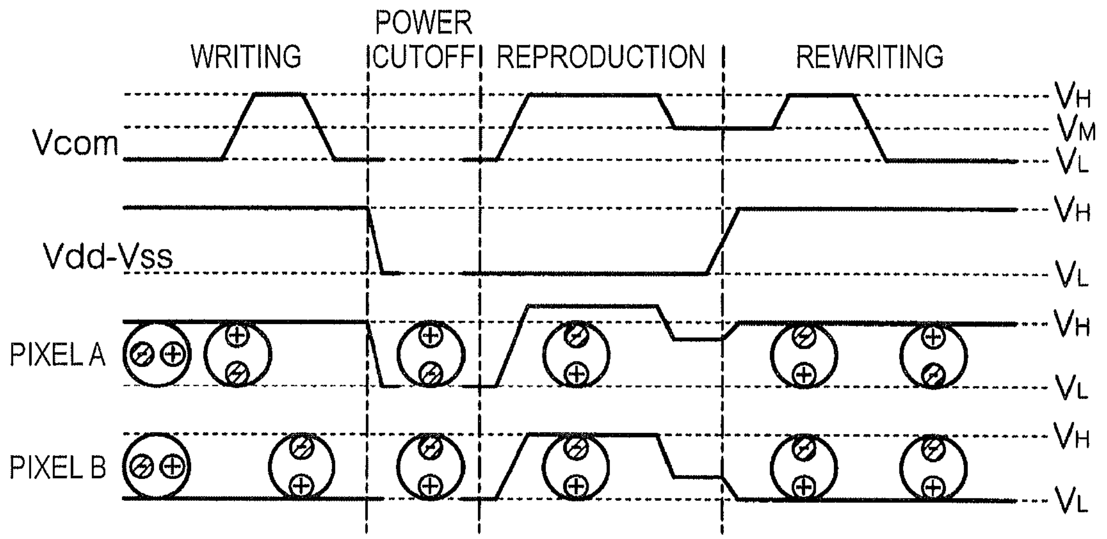
FIG. 5 is a timing chart showing an operation of the information display device D.

FIG. 5 is a timing chart showing an operation of the information display device D. In the drawing, also the state of the electrophoretic particles in the pixel A and the pixel B is schematically drawn. The operation of the information display device D is classified into four stages of writing, power cutoff, reproduction, and rewriting. In the writing stage, processing for writing data into pixels is conducted. As described in FIG. 4A and FIG. 4B, a voltage $V_{COM}$ of the common electrode 13 is switched to the H level after being at the L level. The latch circuit 20 is supplied with power. The data voltages are applied to the respective pixel electrodes 12 in the pixel A and the pixel B.

The power cutoff stage corresponds to step S100 in FIG. 3. In the power cutoff stage, power supply to the display driving circuit 2 and the latch circuit 20 is stopped.

The reproduction stage corresponds to steps S120 to S150 in FIG. 3. In the reproduction stage, three voltages of the L level, H level, and M level are sequentially applied to the common electrode 13.

In the rewriting stage, the display of pixel is refreshed.

As has been described above, according to the embodiment, a display value held in a pixel is acquired without using an additional non-volatile memory. That is, a display value can be reproduced even through the power cutoff stage.

2. Second Embodiment

Subsequently, a second embodiment of the invention will be described. Hereinafter, the description regarding the matters in common with the first embodiment is omitted. Further, common reference signs are used for the elements in common with the first embodiment.

Figure 6:
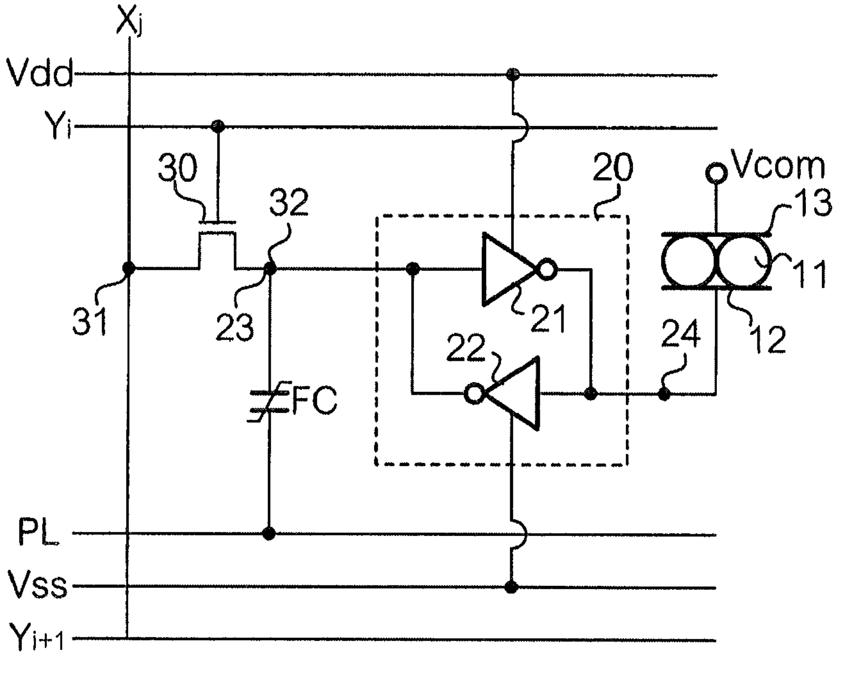
FIG. 6 is a view showing a circuit configuration of a display 1 according to a second embodiment.

FIG. 6 is a view showing a circuit configuration of a display 1 according to the second embodiment. The display 1 according to the second embodiment is different from the display 1 according to the first embodiment in that the display 1 according to the second embodiment has a ferroelectric capacitor FC and a plate line PL. The ferroelectric capacitor FC is a device that stores data written into pixels. The ferroelectric capacitor FC is a passive device and therefore holds data even without the supply of power. One end of the ferroelectric capacitor FC is connected to the input terminal 23 of the latch circuit 20, while the other end thereof is connected to the plate line PL. The plate line PL is a signal line used for the application of voltage to the ferroelectric capacitor FC. Charges according to the potential difference between the input terminal 23 of the latch circuit 20 and the plate line PL are stored in the ferroelectric capacitor FC.

In the writing stage, the potential of the plate line PL is driven in the same manner as the common electrode 13. With this driving, data logically inverted from data written into pixels are written into the ferroelectric capacitor FC. That is, data at the L level is written into the ferroelectric capacitor FC when the potential of the pixel electrode 12 is at the H level, while data at the H level is written when the potential of the pixel electrode 12 is at the L level.

With the adoption of such a configuration, the potential of the input terminal 23 of the latch circuit 20 is equivalent to a potential obtained by logically inverting the data voltage written into pixels. When compared with the configuration of the first embodiment, the potentials of the input terminal 23 and the output terminal 24 of the latch circuit 20 are determined more stably in the initial state. That is, the initial value of the latch circuit 20 can be acquired more stably.

3. Other Embodiments

The invention is not limited to the above-described embodiments and can be variously modified. Hereinafter, some modified examples will be described. The description regarding the matters in common with the above-described embodiments is omitted. Among the following modified examples, two or more of them may be combined and used.

3-1. Modified Example 1

A voltage (fourth voltage) used for the reproduction of a display value may be given to the latch circuit 20 as data substantially at the same time as the M level voltage is applied to the common electrode 13 in the reproduction stage, specifically, in step S150 or after the M level voltage is applied. Now, it is assumed that $V_{th}$ is used as the voltage. That is, when the voltage $V_{th}$ is applied to the data line $X_j$, and the H level voltage is applied to the scanning line $Y_i$, the potential of the input terminal 23 is forced to be at $V_{th}$. After this, the power source of the latch circuit 20 is turned on, whereby the potential of the input terminal 23 is determined more stably in the initial state. Accordingly, the initial value of the latch circuit 20 can be acquired more stably.

3-2. Modified Example 2

The configuration of the information display device D is not limited to one shown in FIG. 1. The functions of plural elements among the elements shown in FIG. 1, for example, the functions of two or more elements among the main control unit 4, the display driving circuit 2, and the power source control circuit 3 may be realized by a physically single device. Specifically, the main control unit 4 may also function as the power source control circuit 3. Alternatively, plural functions of the elements shown in FIG. 1 may be realized by physically plural devices. Specifically, plural functions of the main control unit 4 in the above-described examples may be realized by different devices, respectively.

3-3. Modified Example 3

The latch circuit used for the display 1 is not limited to the dual-inverter type latch circuit shown in FIG. 2. Any latch circuit may be used as long as it has an input terminal and an output terminal and has a circuit configuration in which an initial state is determined based on the potentials of the input terminal and the output terminal. Further, although the input and the output are logically inverted from each other in the latch circuit 20 shown in FIG. 2, the input and the output may be not logically inverted from each other. Moreover, the latch circuit 20 is supplied with power by the voltage line in the above-described embodiments but may have a circuit configuration driven by current.

3-4. Modified Example 4

The electro-optical material included in the electro-optical layer 11 is not limited to the electrophoretic particle. The electro-optical material may be a so-called twist ball (rotary ball) or a charged toner.

3-5. Modified Example 5

In the above-described embodiments, although an example has been described in which the potential of the input terminal 23 is the intermediate potential between the H level and the L level when the supply of power to the latch circuit 20 is started (step S160 in FIG. 3), the potential of the input terminal 23 is not limited thereto. The potential of the input terminal 23 is inconstant in step S160 and therefore might be shifted from the intermediate potential due to the configuration of a specific device or a using method. Also in this case, the potential of the input terminal 23 in step S160 is experimentally obtained in the specific device, and the above-described operation may be conducted using the value. The main control unit 4 stores a proper M level voltage, and the display driving circuit 2 changes the potential of the common electrode 13 under the control of the main control unit 4.

3-6. Modified Example 6

The switching element 30 is not limited to an FET. Any element may be used as long as it can turn on and off the transmission of signal between an input terminal and an output terminal.

3-7. Modified Example 7

In the above-described embodiments, an example has been described in which the first voltage is the L level voltage, and the second voltage is the H level voltage. However, the first and second voltages are not limited thereto. The first voltage may be the H level voltage, and the second voltage may be the L level voltage.

The entire disclosure of Japanese Patent Application No. 2007-259995 filed on Oct. 3, 2007 is expressly incorporated by reference herein.

What is claimed is:

1. A control method for an information display device including:

a display having a data line applied with a data voltage, a switching element having a first input terminal connected to the data line and a first output terminal for turning on and off a signal between the first input terminal and the first output terminal, a latch circuit having a second input terminal connected to the switching element and a second output terminal for holding a voltage according to a data voltage input from the switching element via the second input terminal and for outputting the held voltage, a pixel electrode connected to the second output terminal, a common electrode, and a memory type electro-optical layer interposed between the pixel electrode and the common electrode;

a display driving circuit for driving the display; and a power control circuit for controlling the supply of power to the latch circuit and the display driving circuit, the control method comprising:

stopping, by the power control circuit, the supply of power to the display driving circuit;

stopping, by the power control circuit, the supply of power to the latch circuit;

supplying, by the power control circuit, power to the display driving circuit after the supply of power to the display driving circuit and the latch circuit is stopped;

applying, by the display driving circuit, a first voltage to the common electrode after power is supplied to the display driving circuit;

applying, by the display driving circuit, a second voltage, which is different from the first voltage and varies a potential of the pixel electrode according to a charge state of the memory type electro-optical layer, to the common electrode after the first voltage is applied;

applying, by the display driving circuit, a third voltage, which is a voltage between the first voltage and the second voltage, to the common electrode after the second voltage is applied; and supplying, by the power control circuit, power to the latch circuit after the third voltage is applied.

2. A control method for an information display device according to claim 1, further comprising:

applying, by the display driving circuit, a fourth voltage, which is a voltage between the first voltage and the second voltage, to the data line as a data voltage after the third voltage is applied and before power is supplied to the latch circuit.

3. A control method for an information display device according to claim 1, wherein the third voltage is an intermediate voltage between the first voltage and the second voltage.

4. A control method for an information display device according to claim 1, wherein the display further has a plate line and a ferroelectric capacitor, wherein one end of the ferroelectric capacitor is connected to the second input terminal and an other end of the ferroelectric capacitor is connected to the plate line, and the plate line is driven so as to be at the same potential as the common electrode when the display is rewritten.

5. An information display device comprising a display, the display comprising:

a data line applied with a data voltage;

a switching element having a first input terminal connected to the data line and a first output terminal for turning on and off a signal between the first input terminal and the first output terminal;

a latch circuit having a second input terminal connected to the switching element and a second output terminal for holding a voltage according to a data voltage input from the switching element via the second input terminal and for outputting the held voltage;

a pixel electrode connected to the second output terminal;

a common electrode;

a plate line;

a ferroelectric capacitor including one end connected to the second input terminal and an other end connected to the plate line; and a power control circuit selectively stopping supplying power to the display driving circuit and the latch circuit and, after stopping supplying power to the display driving circuit and the latch circuit, resuming supplying power to the display driving circuit, wherein the display driving circuit:

applies a first voltage to the common electrode after power supply to the display driving circuit is resumed, applies a second voltage to the common electrode after the first voltage is applied, wherein the second voltage is (i) different from the first voltage and (ii) varies a potential of the pixel electrode according to a charge state of a memory type electro-optical layer connected between the pixel electrode and the common electrode, and applies a third voltage, which is a voltage between the first voltage and the second voltage, to the common electrode after the second voltage is applied, and wherein the power control circuit resumes supplying power to the latch circuit after the third voltage is applied.

* * * * *